United States Patent
Harter et al.

(10) Patent No.: US 9,457,478 B2
(45) Date of Patent: Oct. 4, 2016

(54) AREA VACUUM GRIPPER

(71) Applicant: J. Schmalz GmbH, Glatten (DE)

(72) Inventors: Leonhard Harter, Loßburg (DE); Ken Steyerl, Nagold (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/763,392

(22) PCT Filed: Jan. 21, 2014

(86) PCT No.: PCT/EP2014/051089
§ 371 (c)(1),
(2) Date: Jul. 24, 2015

(87) PCT Pub. No.: WO2014/114621
PCT Pub. Date: Jul. 31, 2014

(65) Prior Publication Data
US 2015/0352726 A1    Dec. 10, 2015

(30) Foreign Application Priority Data

Jan. 25, 2013 (DE) .................. 10 2013 201 248

(51) Int. Cl.
*B25J 15/06* (2006.01)
*B25J 19/00* (2006.01)
*B65G 47/91* (2006.01)

(52) U.S. Cl.
CPC ......... *B25J 15/0616* (2013.01); *B25J 15/0691* (2013.01); *B25J 19/00* (2013.01); *B65G 47/91* (2013.01); *B65G 47/917* (2013.01)

(58) Field of Classification Search
CPC .. B25J 15/0616; B25J 15/0691; B25J 19/00; B25J 15/0675; B25J 15/0683; B65G 47/91; B65G 47/917

USPC .............................. 294/185, 183, 188; 901/40
See application file for complete search history.

(56) References Cited

U.S. PATENT DOCUMENTS

| | | | |
|---|---|---|---|
| 3,910,621 A | 10/1975 | Hillier | |
| 4,265,476 A * | 5/1981 | Elgart | B25B 11/007 269/21 |
| 4,703,966 A | 11/1987 | Lewecke et al. | |

(Continued)

FOREIGN PATENT DOCUMENTS

| | | |
|---|---|---|
| DE | 3636523 A1 | 5/1988 |
| DE | 19817217 C1 | 8/1999 |

(Continued)

OTHER PUBLICATIONS

International Search Report and Written Opinion of the International Searching Authority mailed May 6, 2014 in PCT International Application No. PCT/EP2014/051089.

*Primary Examiner* — Gabriela Puig
(74) *Attorney, Agent, or Firm* — Howard & Howard Attorneys PLLC

(57) ABSTRACT

A surface area vacuum gripper for sucking and handling workpieces, comprising a housing, in which a negative pressure vacuum chamber is provided that can be subjected to negative pressure and wherein the housing includes suction openings on the suction side, facing the workpiece. An insertion element is provided in the housing, which reduces the free inner space of the housing and includes vacuum channels fed by a vacuum generator. The insertion element can be equipped with a plurality of optional functions.

7 Claims, 1 Drawing Sheet

(56) References Cited

U.S. PATENT DOCUMENTS

| | | | |
|---|---|---|---|
| 4,881,770 A | | 11/1989 | Marzinotto et al. |
| 5,259,859 A | * | 11/1993 | Claassen ............... C03B 40/005 294/188 |
| 5,749,614 A | * | 5/1998 | Reid ...................... B65G 47/91 414/627 |
| 7,661,736 B2 | * | 2/2010 | Schmalz .............. B25J 15/0616 294/183 |
| 8,251,422 B2 | * | 8/2012 | Cheng ............... H01L 21/67333 294/183 |
| 2008/0129062 A1 | | 6/2008 | Schmalz et al. |
| 2015/0360371 A1 | * | 12/2015 | Harter ................. B25J 15/0616 294/186 |

FOREIGN PATENT DOCUMENTS

| | | | | |
|---|---|---|---|---|
| DE | 10216221 C1 | * | 10/2003 | .......... B26J 15/0616 |
| DE | 102005014115 A1 | | 9/2006 | |
| DE | 102006013970 A1 | | 9/2007 | |
| DE | 102006050970 A1 | | 4/2008 | |
| EP | 0267874 A1 | | 5/1988 | |

* cited by examiner

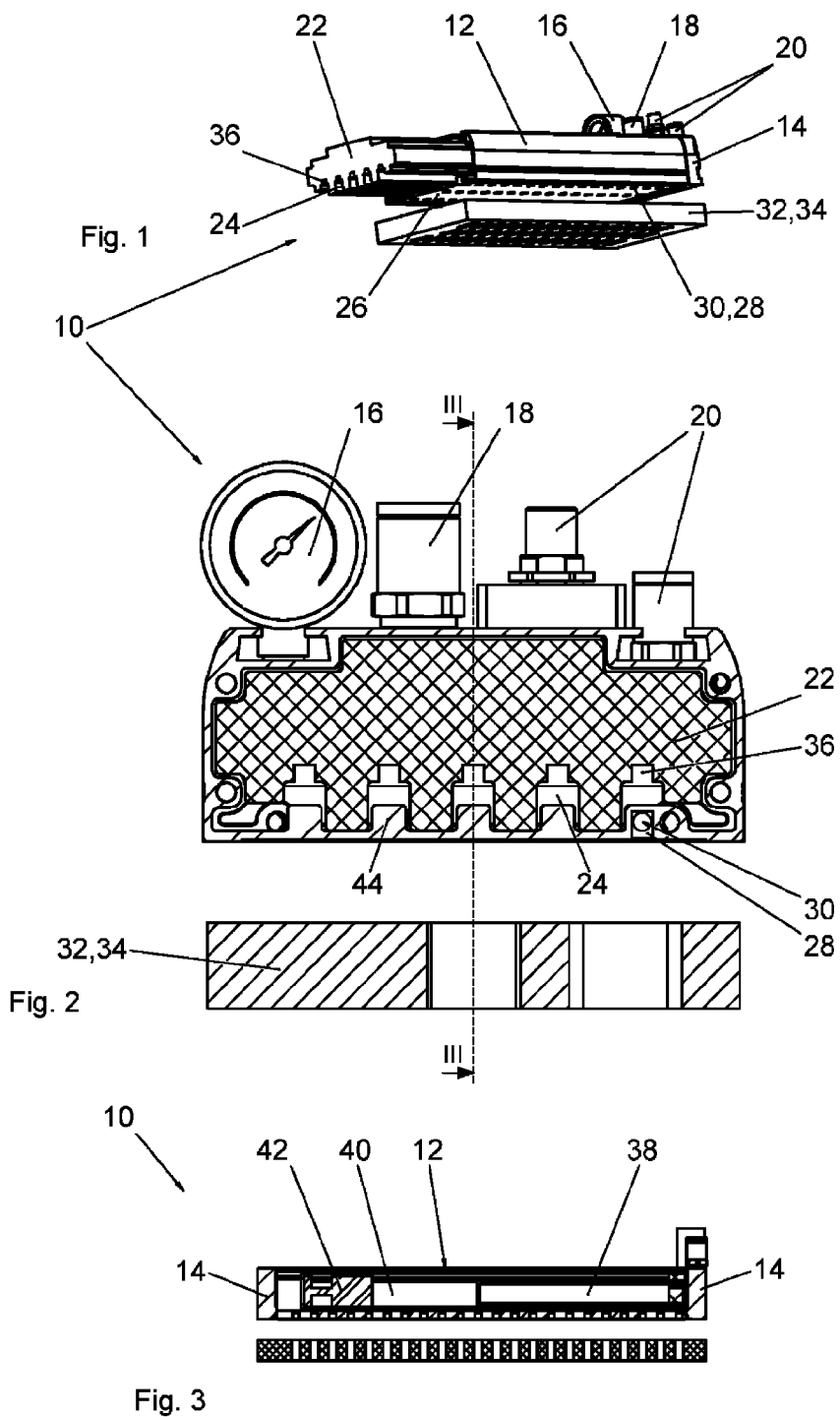

AREA VACUUM GRIPPER

CROSS-REFERENCE TO RELATED APPLICATIONS

The present application is a National Stage of International Patent Application No. PCT/EP2014/051089, filed on Jan. 21, 2014, which claims priority to and all the benefits of German Patent Application No. 10 2013 201 248.9, filed on Jan. 25, 2013, both of which are hereby expressly incorporated herein by reference in their entirety.

BACKGROUND OF THE INVENTION

1. Field of the Invention

The invention relates to a surface area vacuum gripper for sucking onto and handling workpieces, with a housing, which is provided with a negative pressure chamber that can be acted upon with negative pressure and the housing comprises suction openings on its side facing the workpiece.

2. Description of the Related Art

Surface area vacuum grippers serve in particular for gripping and lifting of objects, such as positionally stable flat materials, such as boards or plates, or smaller objects, such as cans, cups, dishes or the like. The surface area vacuum gripper comprises a flexible lining, which is usually applied to the top side of the objects to be gripped. Foam lining has proven as advantageous, because it conforms well to the sometimes uneven surface. There is, however, still the problem that different objects have different surfaces and sometimes large gaps exist between the objects.

However, the flow behavior of the conventional suction grippers is too slow to quickly respond to different objects.

If the surface area vacuum gripper is equipped with flow valves with a predetermined suction, the valve bodies must not be too sluggish, because otherwise they do not close. Fast-acting valve bodies carry the risk that they will close when a sucked-on workpiece e.g. is briefly lifted by vibration so that briefly ambient air is sucked in. In this case, the workpiece would drop.

Publications U.S. Pat. No. 7,661,736 B2, DE 36 36 523 C2, DE 198 17 217 C1, DE 10 2006 050 970 A1, U.S. Pat. No. 3,910,621 A and EP 0 267 874 A1 describe surface area vacuum grippers, in which components are arranged in the negative pressure chamber.

SUMMARY OF THE INVENTION

The present invention therefore has for its object to further develop a suction gripper surface of the aforementioned type in such a way that even slow-closing valves can be used.

According to the invention, this technical task is solved with a surface area vacuum gripper wherein an insert element is disposed in the housing, which reduces the free inner space of the housing and includes negative pressure channels supplied by a generator of negative pressure. Further features become evident from dependent claims.

According to the invention, the insert element reduces the negative pressure chamber within the housing and thus improves the responsiveness of the surface area vacuum gripper. Since the dead space is reduced by the insert element, each individual suction opening responds better even for a smaller suction volume flow. It is not a large suction volume that needs to be evacuated. Any present flow valves may be designed in their closing behavior in a sluggish manner. This design of the flow valves thus allows a reliable lifting and transportation of objects without the existence of the danger that the valve closes during the lifting procedure due to leakage on the surface of the sucked-on object. The invention thus ensures the transportation of objects with leakage with a minimal use of the total volume flow.

Another advantage consists in the fact that the surface area vacuum gripper can be quickly adapted to different purposes by different insert elements in that the suitable insert element is inserted into the housing. This allows complementing or changing the functions. The surface area vacuum gripper is designed in the fashion of a construction kit.

In a further development of the invention, the insert element includes negative pressure channels designed as grooves on its bottom side facing the suction side of the housing. These negative pressure channels are connected to the generator of negative pressure and form with the feeding lines quasi the only dead space connected with the suction openings. Its volume depends solely on the dimensions of the grooves and the feeding lines and can therefore be kept very small.

To prevent a breakdown of the whole negative pressure system caused by leakage or unoccupied suction openings, the grooves can be sealed from each other. In addition, the grooves themselves can comprise one or more dividers over their length.

The housing can be frontally closed and the insert element can be frontally inserted into the housing and pulled out again. Advantageously, the housing is an extruded profile, wherein the grooves extend in the longitudinal direction of the housing or its extruded profile. The grooves can therefore be formed during the manufacturing of the housing, wherein they protrude on the inner side of the suction side of the housing. If the insert element is inserted into the housing frontally, the studs mesh into the grooves of the insert element.

In one embodiment of the invention, the insert element includes at least a receiving chamber e.g. for an ejector or a multi-stage ejector for a pressure reservoir or a negative pressure reservoir. The pressure or negative pressure reservoir can be formed directly in the insertion channel. In this manner, negative pressure is immediately present at the suction openings and, if needed, can be quickly released by the pressure stored in the pressure reservoir. Using the higher pressure, any impurities can also be blown out. A further development provides that electrical components such as valves, sensors, energy storage, cameras, controllers, etc., are mounted within or on the insert element.

An advantageous embodiment provides that the insert element includes at least one lighting device. The lighting device illuminates the negative pressure channel and one or more suction openings and shines from the inside to the outside. The surface area vacuum gripper can thus illuminate the surface of the object to be gripped before it touches down on it, which is of great advantage in particular in insufficiently lit workplaces. In addition or as an alternative, in the insert element and in particular in the suction openings reflectors can be provided. If the suction openings are illuminated from outside, any dirt can be easily recognized.

With preference, the invention further provides that the insert element comprises at least one compressed air channel and/or compressed air nozzles. On the one hand, by these compressed air nozzles dirt can be easily blown out, on the other hand it serves to release the gripped workpiece.

In another embodiment, the insert element has at least one electrically driven pump for generating vacuum. In this variant, the supply line for compressed air and/or negative pressure is omitted. It only requires electrical supply leads.

To be able to operate this surface area vacuum gripper at least in the short term even without a connection to the mains supply, the insert element comprises at least one energy storage device, for example, an accumulator. It operates the electric pump and can later be recharged.

Further advantages, features and details of the invention become evident from the dependent claims and the following description, which describes a particularly preferred embodiment with reference to the drawing. The features shown in the drawing and mentioned in the description and in the claims can each be essential to the invention individually or in any combination.

BRIEF DESCRIPTION OF THE DRAWINGS

The drawings show:

FIG. 1 is an exploded view of the invented surface area vacuum gripper, partly cut;

FIG. 2 is a cross-section of the surface area vacuum gripper; and

FIG. 3 is a longitudinal section III-III according to FIG. 1 through the surface area vacuum gripper.

DETAILED DESCRIPTION OF THE INVENTION

In FIG. 1 is shown in perspective view a surface area vacuum gripper 10, which includes a housing 12, which is for example a section of an extruded profile. Alternatively the housing 12 can also be a bent sheet metal part, 3D compression-molded part, CFRP part or a cast part. The housing 12 is closed frontally by two end caps 14. At the end cap 14 shown in FIG. 1, there is a pressure gauge 16, a pressure air connection 18 and further connections 20, which are not essential for the invention. In housing 12 is located an insert element 22, which reduces the free interior of the housing 12 and conforms to the inner surface of housing 12 as close as possible, but still has so much play to it that it can be inserted into the housing 12 and removed again, i.e. it can be pulled out. The insert element 22 has negative pressure channels designed as grooves 24 on its underside. Corresponding to these grooves 24, the housing 12 has at its bottom 26 several rows with suction openings 28 which are designed as flow resistance or serve for receiving flow valves 30, for example, valve balls or the like. To the bottom 26 is attached a flexible lining 32, which is formed by a foam pad 34 or a sealing plate. This lining 32 is formed porous or into this lining 32 is introduced a plurality of slots or apertures which in turn spatially correspond with the suction openings 28.

Further, it can be seen in FIG. 2 that on the inside of the bottom 26 extend studs 44, in which the suction openings 28 are provided and by which the individual grooves 24 are sealed from each other. Above the grooves 24 are recesses 36, in which, for example, lighting bodies, reflectors, blow-off nozzles and/or the like may be used. These recesses 36 are located in the extension behind the suction channels or suction openings 28.

FIG. 3 shows in the longitudinal section III-III the insert element 22 in the housing 12 and there is also illustrated a vacuum generator 38. This vacuum generator 38 is directly connected to the end cap 14 so that through this cap the inlets and outlets for fluids and electric power as well as data can be conducted. The insert element 22 is formed as a hollow body 40 and serves as a reservoir for compressed air or as a vacuum reservoir. In this case, the vacuum generator is inserted directly into the insert element 22. The hollow body 40 designed as a vacuum reservoir has an opening closable with a flap in the direction of the flow openings 28. The flap can be opened with a cylinder 42 so that vacuum is abruptly created at the flow openings 28. This has the particular advantage that even slowly reacting valves can be used. In addition, a memory may be integrated in the insert element 22 as a separate component.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A surface area vacuum gripper for sucking onto and handling of workpieces, said surface area vacuum gripper comprising:

a frontally closable housing having a negative pressure chamber which can be exposed to vacuum, said housing includes suction openings on its suction side facing the workpiece, and an insert element disposed in the housing and configured to be frontally inserted into and again pulled out from the housing, which insert element reduces the free inner space of the housings and includes vacuum channels supplied by a vacuum generator, wherein the vacuum channels are configured as grooves on the bottom side of the insert element facing the suction side of the housing, wherein the grooves are sealed from each other, and wherein the housing is an extruded profile and wherein the grooves extend in longitudinal direction of the housing and the profile, and wherein fillets are provided on the inner side of the suction side of the housing, which protrude into the grooves of the insert element.

2. The surface area vacuum gripper as set forth in claim 1, wherein the insert element includes at least one receiving chamber configured to receive a vacuum generator or a pressure reservoir or a vacuum reservoir.

3. The surface area vacuum gripper as set forth in claim 1, wherein the insert element includes recesses above the grooves, wherein at least one illumination device is disposed inside at least one of the recesses.

4. The surface area vacuum gripper as set forth in claim 3, wherein the illumination device is configured to illuminate the vacuum channel and/or one or more suction openings.

5. The surface area vacuum gripper as set forth in claim 1, wherein the insert element includes recesses above the grooves, wherein at least one blow-off nozzle is disposed inside at least one of the recesses.

6. The surface area vacuum gripper as set forth in claim 1, wherein the insert element includes at least one electrically driven pump for the generation of vacuum.

7. The surface area vacuum gripper as set forth in claim 1, wherein the insert element includes at least one energy reservoir configured as an accumulator, and/or at least one sensor, and/or at least one camera.

* * * * *